United States Patent
Mattar

(10) Patent No.: US 6,386,046 B1
(45) Date of Patent: May 14, 2002

(54) METHOD AND SYSTEM FOR CHARACTERIZING PULSATILE FLOW IN A VORTEX FLOWMETER

(75) Inventor: Wade Mattar, Wrentham, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/406,873

(22) Filed: Sep. 28, 1999

(51) Int. Cl.$^7$ ................................................ G01F 1/32
(52) U.S. Cl. .................................................. 73/861.22
(58) Field of Search ........................ 73/861.22, 861.23, 73/861.18, 861.19, 861.21

(56) References Cited

U.S. PATENT DOCUMENTS

| | | | |
|---|---|---|---|
| 3,587,312 A | 6/1971 | McMurtrie et al. | ............ 73/204 |
| 3,709,034 A | 1/1973 | Herzl | |
| 5,942,696 A | * 8/1999 | Kleven | .................... 73/861.22 |

FOREIGN PATENT DOCUMENTS

| | | | | |
|---|---|---|---|---|
| GB | 2 061 505 A | | 9/1980 | |
| GB | 2 061 505 A | * | 5/1981 | ............. G01F/1/32 |

OTHER PUBLICATIONS

Peters, M.C.A.M. et al., "Impact of pulsations on vortex flowmeters," Paper presented at Flomeko '98, Lund, Sweden, pp. 1–6 (1998).

"Scaling up a fluidized bed reactor," "Simulation of high–amplitude transients in pipe systems," "Impact of pulsations and vibrations on vortex flowmeters,""A pulsation study to increase pulsations?" TNO Institute of Applied Physics, Pulsim Newsletter, Simulation of transients Vortex meters and pulsations Pulsims and Sulzer, Dec. 1998.

* cited by examiner

*Primary Examiner*—Benjamin R. Fuller
*Assistant Examiner*—Corey D. Mack
(74) *Attorney, Agent, or Firm*—Kevin A. Oliver; W. Hugo Liepmann; Foley, Hoag & Eliot LLP

(57) ABSTRACT

A method for determining the pulsatile flow characteristics in fluid flow driven by a periodic pressure disturbance includes the step of evaluating the spectrum of a signal representative of the vortices generated by a vortex flowmeter. Because of the periodic pressure disturbance, the signal is an FM signal in which a carrier, having a frequency corresponding to the vortex-shedding frequency in the absence of pulsating flow, is modulated by the periodic pressure disturbance. The pulsation frequency and amplitude are then estimated on the basis of the separation between adjacent sidebands of the spectrum of the FM signal and the relative amplitudes of the sidebands.

39 Claims, 6 Drawing Sheets

METHOD AND SYSTEM FOR CHARACTERIZING PULSATILE FLOW IN A VORTEX FLOWMETER

This invention relates to the field of fluid flow measurement, and in particular to methods and systems for characterizing pulsating flow through vortex flowmeters.

BACKGROUND

When fluid flows past an obstacle, the obstacle causes a disturbance in the fluid flow. This disturbance is manifested by a vortex generated on one side of the obstacle followed shortly thereafter by another vortex generated on the other side of the obstacle. The two sides of the obstacle continue to alternately generate, or shed, vortices so long as the fluid continues to flow. The frequency at which the two sides of the obstacle shed these vortices is proportional to the velocity of the fluid relative to the obstacle. It is this relationship between the vortex-shedding frequency and the flow velocity that is the basis for the operation of the known vortex flowmeter.

In a vortex flowmeter, an obstacle in the fluid flow, often termed a bluff body, generates the alternating series of vortices. These vortices flow past a transducer, usually a pressure transducer, located at or near the bluff body. Since each vortex is associated with a low pressure zone in the fluid, each time a vortex flows past the pressure transducer, it causes the pressure transducer to generate a pulse having an amplitude proportional to the fluid density and to the square of the fluid velocity. Since the vortices flow with the fluid, the frequency of these pressure pulses, referred to as the "vortex-shedding frequency," is proportional to the fluid velocity. The signal generated by the pressure transducer thus includes a fundamental frequency corresponding to the fluid velocity.

A vortex flowmeter operating in the foregoing manner can provide an accurate measurement of the flow velocity in a fluid-transport system when the fluid flow is either constant or changes slowly compared to the vortex-shedding frequency. Under these circumstances, the vortex-shedding frequency is linearly related to the fluid velocity, as shown in FIG. 1. The slope of the line in FIG. 1, referred to as the "meter factor," can be empirically obtained in a particular fluid-transport system by calibrating the flowmeter.

A difficulty can arise, however, when the flow varies significantly with time, and in particular when the time-varying flow is a periodic pulsating flow characterized by a pulsation frequency. Such a flow can arise from a variety of sources present in a typical fluid-transport system. These sources include reciprocating pumps, storage tanks having time-varying heads, and resonances in the piping system.

Under these circumstances, most flowmeters are prone to error. In the case of the vortex flowmeter, the pulsating flow and the shedding vortices interact in a manner not fully understood. As a result of this interaction, the vortex-shedding frequency may no longer be linearly related to the fluid velocity, as shown in a representative meter factor curve in FIG. 2. In particular, when the pulsation frequency and the vortex-shedding frequency are nearly harmonically related, the vortex shedding frequency is independent of the fluid velocity, as shown by the discontinuities in FIG. 2.

The source of this difficulty can be understood by consideration of Bernoulli's equation, which resolves the total pressure applied to a system into two components: a dynamic pressure component, which is proportional to the square of the fluid velocity, and a static pressure component. When the total pressure applied to the system consists of a steady component combined with a pulsatile disturbance, each term in Bernoulli's equation is likewise the sum of a steady component, representing the system response to the steady component of the total pressure, and a pulsatile component, representing the system response to the pulsatile disturbance in the total pressure. Under these circumstances, the vortex flowmeter measures a velocity that includes a first contribution from the steady component of the dynamic pressure and a second contribution from the pulsatile component of the dynamic pressure. The first contribution corresponds to the desired velocity measurement. The second contribution, which is often assumed to be zero, can introduce an error in the measured vortex flowmeter signal.

The extent to which the pulsatile component of the dynamic pressure contributes to the velocity measured by the vortex flowmeter depends, to a large extent, on the mechanical compliance of the complete fluid-transport system and on the amplitude and frequency of the pulsating flow. As a result, when pulsating flow exists in a fluid-transport system, the system operator's repertoire of responses, assuming the operator is able to detect the existence of pulsating flow, is limited to: eliminating the source of pulsating flow, heuristically correcting the flowmeter measurement, or accepting the inaccuracy in the flowmeter measurement.

In many cases, the operator is unable to detect the existence of pulsating flow. This is because an operator who observes a particular vortex-shedding frequency has no way of determining whether the observed frequency results from a steady flow at a velocity linearly related to that frequency or whether the vortex-shedding frequency results from pulsatile flow.

In other cases, the operator might ignore a flowmeter signal that suggests a malfunctioning flowmeter when in fact, the flowmeter is correctly tracking the pulsating flow.

SUMMARY OF THE INVENTION

When a vortex flows past the pressure transducer in a vortex flowmeter, it causes the transducer to generate a response. As a result, the pressure signal generated by the transducer has a dominant or fundamental frequency corresponding to the rate at which vortices are swept past the pressure transducer. This frequency, which is the vortex-shedding frequency in the absence of any disturbance to the flow, is referred to as the "steady-state vortex-shedding frequency."

When a pulsatile disturbance disturbs the flow, the velocity at which the flow carries the vortices past the transducer varies periodically in response to the disturbance. This variation in flow velocity changes, or modulates, the steady-state vortex-shedding frequency. The resulting pressure signal can thus be considered to be an FM signal having a carrier frequency equal to the steady-state vortex-shedding frequency. A method and system incorporating the principles of the invention uses the spectrum of this FM signal to estimate the pulsatile flow characteristics of the pulsatile disturbance. These pulsatile flow characteristics include the amplitude and pulsation frequency of the pulsatile disturbance.

A method, according to the invention, for determining the pulsation frequency in a fluid flow having a periodically-varying flow velocity includes the steps of generating, and obtaining the measured spectrum of, a flowmeter signal having a carrier frequency modulated by the pulsation frequency. The measured spectrum is then used to estimate the pulsation frequency and amplitude.

In a preferred embodiment, the step of obtaining a measured spectrum includes the step of resolving the measured spectrum into first and second spectral components separated from each other by a gap. The pulsation frequency is then estimated on the basis of the extent of this gap. The relative amplitudes of the spectral components can then be used to estimate the amplitude of the pulsating flow. The estimation of pulsation amplitude and frequency can be accomplished by comparing the measured spectrum to a calibration spectrum corresponding to a known flow condition. The calibration spectrum can be generated empirically or by calculation. In either case, the calibration spectrum can be stored in a database so as to be readily available for comparison with a measured spectrum.

The pulsation amplitude and frequency obtained in the above manner can then be used to correct for any non-linearities in the meter factor and to thereby correct the measurement of flow velocity. This can be accomplished by empirically generating meter-factor calibration curves for a variety of pulsation amplitude and frequency combinations and selecting from this set of calibration curves the meter-factor calibration curve that corresponds to the measured pulsation amplitude and frequency combination.

The flowmeter signal is preferably generated by providing a vortex-generating structure in the fluid flow. Such a structure, which is typically a conventional vortex flowmeter, generates vortices at a vortex-shedding frequency indicative of the flow velocity. These vortices can then be used to generate a flowmeter signal representative of the vortex-shedding frequency.

The invention is not, however, restricted to flowmeters having pressure transducers. The signal processing steps disclosed herein can readily be adapted for use with any flowmeter that generates a flowmeter signal modulated by a pulsatile flow. In particular, the signal processing steps can be applied when the vortices generated by a vortex flowmeter are detected without detecting fluctuations in pressure. For example, there exist vortex flowmeters in which the vortices are detected by illuminating the flow with ultrasonic waves and using a radiation-responsive transducer to detect the phase shift associated with reflections from vortices.

For some combinations of vortex-shedding frequency and pulsation frequency, the resulting signal cannot readily be used to estimate the pulsation amplitude and frequency. It is therefore desirable to predict the occurrence of these combinations. In an optional feature of the invention, the gap between the first and second spectral components is compared to a first selected threshold. If the gap falls below the first selected threshold, the width of the first spectral component is compared to a second selected threshold. If this width falls below the second selected threshold, an alarm signal is generated.

The invention also includes a system for determining, on the basis of a frequency-modulated flowmeter signal, a pulsation amplitude and frequency in a fluid flow having a periodically-varying flow velocity. Such a system includes a spectrum analyzer for obtaining a measured spectrum of the flowmeter signal and a pattern recognition unit coupled to the spectrum analyzer for estimating the pulsation amplitude and frequency on the basis of the measured spectrum.

In a preferred embodiment, the spectrum analyzer includes a spectral resolution process for resolving the measured spectrum into a first spectral component and a second spectral component separated from the first spectral component by a gap representative of the pulsation frequency.

A system embodying the invention optionally includes a vortex-shedding structure, such as a vortex flowmeter, in the fluid flow. Such a structure, when placed in the path of a flowing fluid, generates vortices at a vortex-shedding frequency indicative of the fluid's flow velocity. A transducer disposed proximately to the vortex-shedding structure detects the vortices and generates a flowmeter signal representative of the vortex-shedding frequency.

Since it is desirable to notify an operator when the pulsation and vortex-shedding frequency are such as to render measurements meaningless, an optional feature of a system embodying the principles of the invention is a thresholding process for determining whether the gap between the first and second components is below a first selected threshold and determining whether the width of the first component is below a second selected threshold. In this case, an alarm signal generator operates in conjunction with the thresholding process to generate an alarm signal when the gap is below the first selected threshold and when the width is below the second selected threshold.

BRIEF DESCRIPTION OF THE DRAWINGS

These and other aspects of the invention will be apparent upon reading the following specification in view of the attached drawings in which.

DETAILED DESCRIPTION

Figure 3:
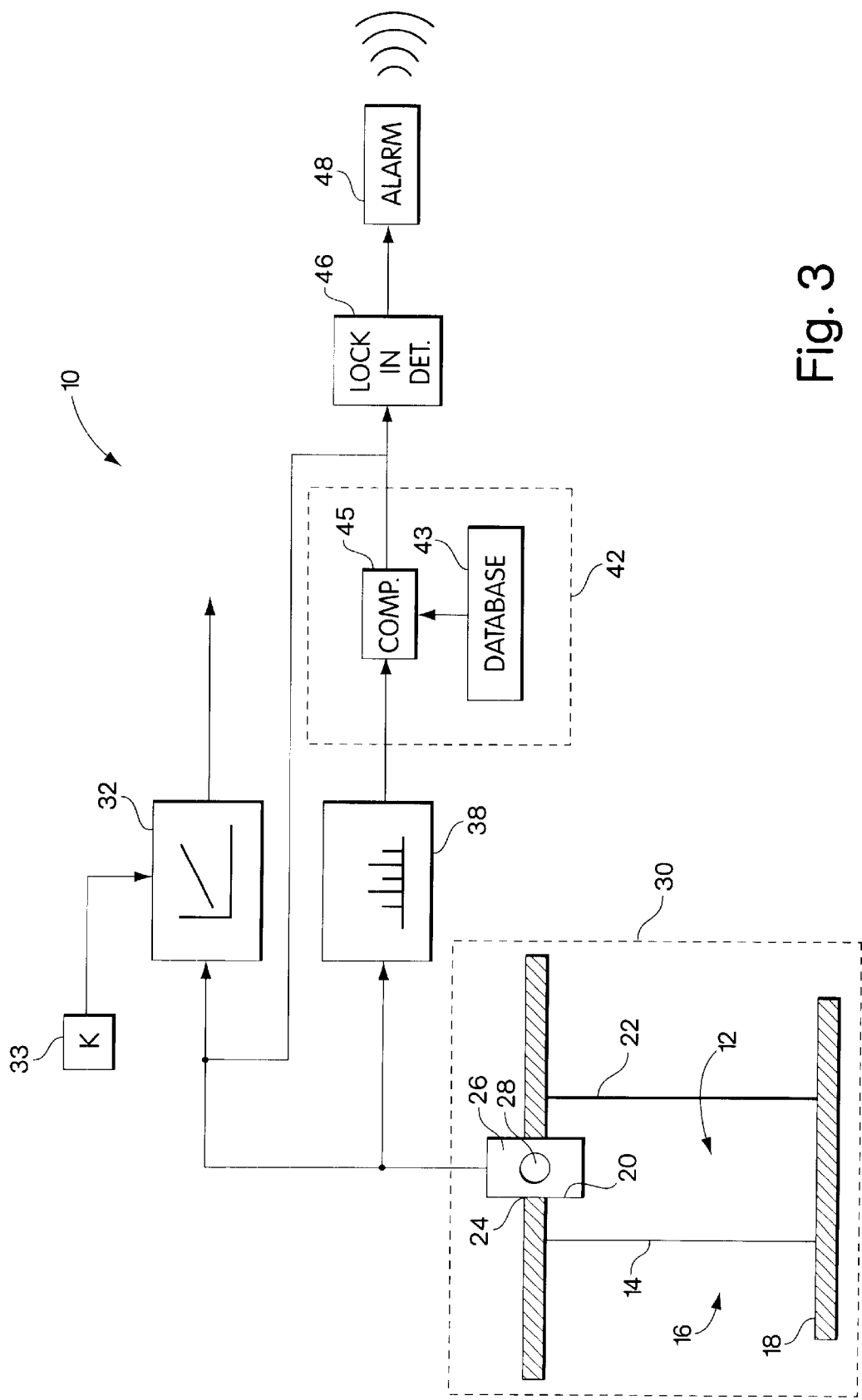
FIG. 3 shows a system embodying the principles of the invention.

Referring to FIG. 3, a vortex flowmeter system 10 embodying the invention includes a bluff body 12 having a leading edge 14 and extending diametrically across a tube 16 formed by a tube wall 18. The bluff body 12 is disposed such that a recess 20 in a recessed end 22 of the bluff body 12 is aligned with an aperture 24 formed in the tube wall 18. A pressure transducer 26 having a pressure sensitive membrane 28 is inserted through the aperture 24 and into the recess 20 in the bluff body 12 such that the pressure sensitive membrane 28 is exposed to fluid flowing through the tube 16. The tube 16, the bluff body 12, and the pressure transducer 26 together form a vortex flowmeter 30.

The pressure transducer 26 connects to a velocity computation module 32 that estimates the fluid velocity on the basis of the vortex shedding frequency. A meter-factor calibration database 33 provides the velocity computation module 32 with a set of experimentally determined meter factors K that relate the unknown flow velocity to the measured vortex shedding frequency for a variety of combinations of pulsation amplitude and frequency. The meter factor curves in the calibration database 33 can be generated during a training step by operating the fluid-transport system at one or more known steady-state velocities with one or more known pulsatile disturbances of varying amplitudes and frequencies impressed upon the known steady-state velocity. The resulting measured relationships between the measured vortex shedding frequency and the steady-state flow velocity are then tabulated and stored in the calibration database 33. To obtain the unknown flow velocity, the velocity computation module 32 selects an appropriate meter factor for the measured pulsation amplitude and frequency determined. The computation module 32 then multiplies the vortex shedding frequency by the meter factor (or its reciprocal, depending on the definition of the meter factor). The result is the flow velocity that corresponds to the measured vortex-shedding frequency.

Figure 1:
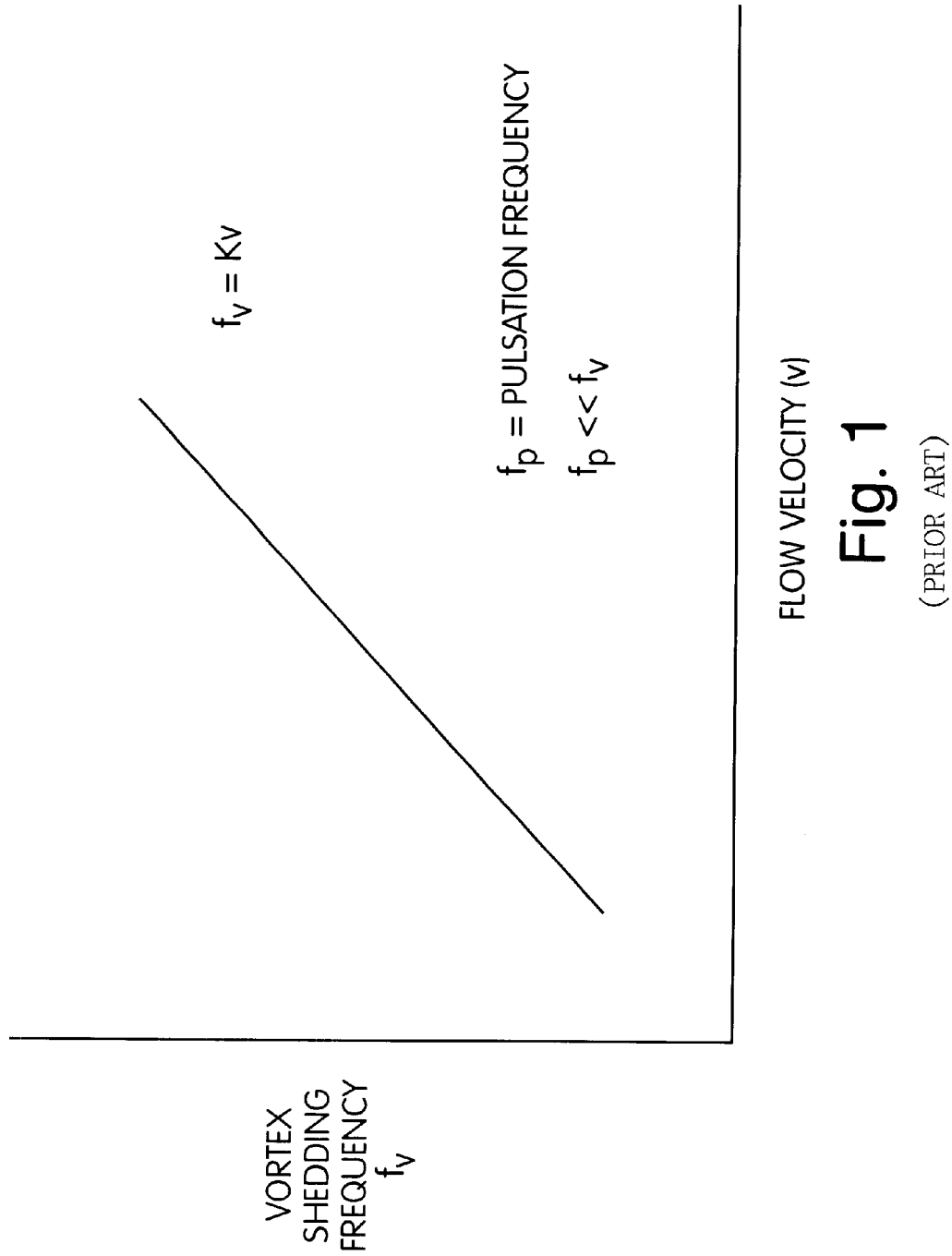
FIG. 1 is a representative meter-factor curve showing the linear relationship between the vortex-shedding frequency and the fluid velocity in a conventional vortex flowmeter in a steady flow.
Figure 2:
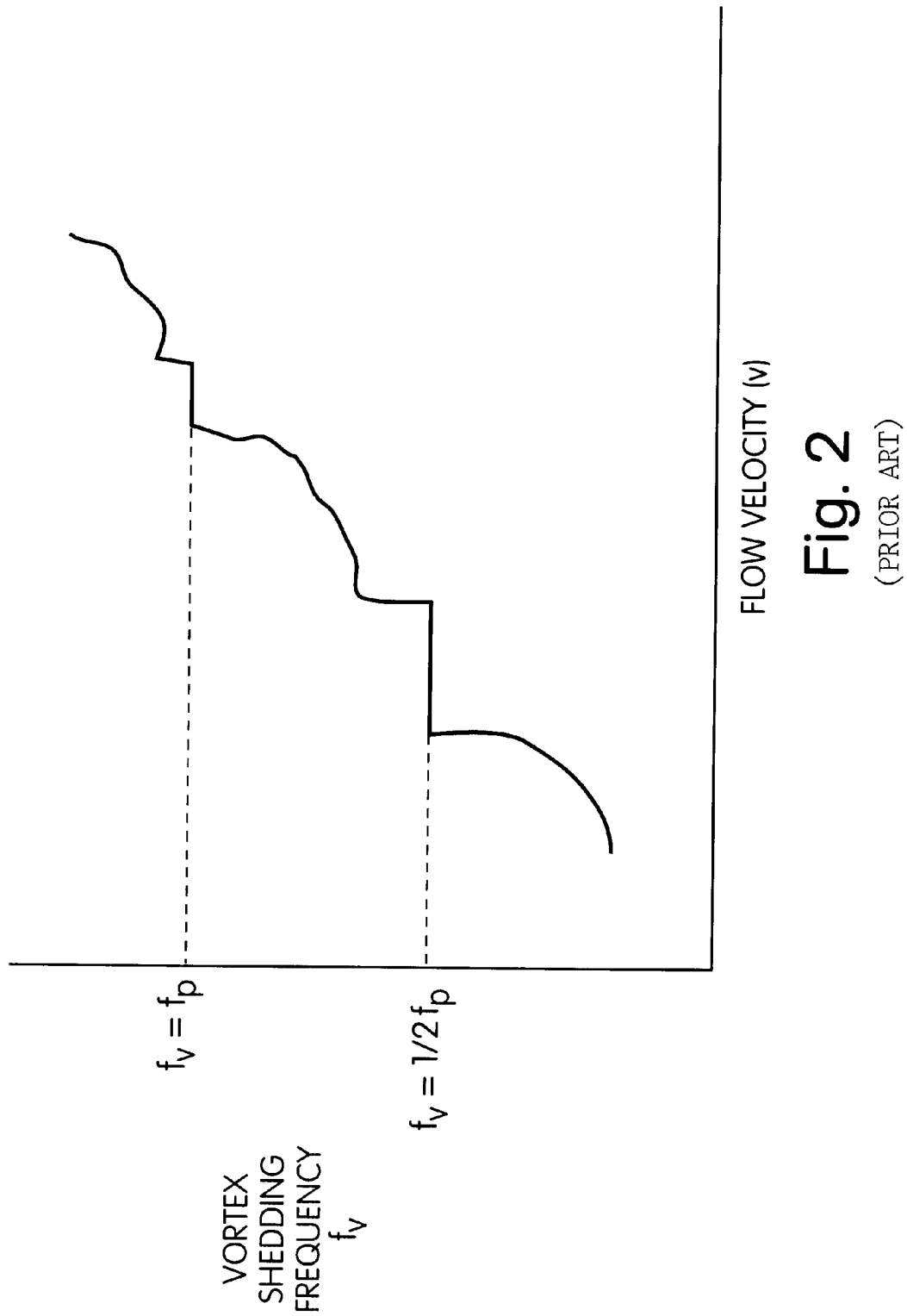
FIG. 2 is another representative meter-factor curve showing the disruption in the linear relationship depicted in FIG. 1 that results from the existence of pulsating flow.

As shown in FIG. 2, the assumption of linearity in the meter factor can be erroneous when the flow velocity includes both a pulsatile component and a steady component. Moreover, on those rare occasions in which the pulsation frequency is approximately an integral multiple of the vortex shedding frequency ($\omega_p \approx n\omega_v$ for integer n), the vortex shedding frequency becomes decoupled from the steady component of the flow velocity. This unusual phenomenon, referred to as "lock-in," can result in significant errors in the estimate of the flow velocity when the pulsation frequency is within a forbidden interval surrounding $n\omega_v$ for integer values of n. In these forbidden intervals, two of which are shown in FIG. 2, the measured vortex-shedding frequency is largely independent of the flow velocity. The width of the forbidden intervals depends on the value of n, with the widest such interval corresponding to n=2 and the second widest corresponding to n=1.

The pressure transducer 26 also connects to the input of a spectrum analyzer 38 adapted to decompose the pressure signal generated by the pressure transducer 26 into its frequency components. The spectrum analyzer 38 typically performs this task by calculating the FFT of the pressure signal, either using software instructions executed on a digital computer, an application specific integrated circuit ("ASIC"), or similar hardware.

The output of the spectrum analyzer 38 is connected to a pattern recognition module 42 for determining, on the basis of the received spectrum, whether the flow includes a pulsatile component, and if so, the pulsation amplitude and frequency of that component. The pattern recognition module 42 includes a spectral database 43 containing calibration spectra, each of which corresponds to a particular combination of steady-state flow velocity and pulsating flow velocity. The calibration spectra are typically loaded into the spectral database 43 during a training step in which the fluid-transport system is operated at one or more known steady-state velocities with one or more known pulsatile disturbances of varying amplitudes and frequencies impressed upon the known steady-state velocity. The spectra of the pressure signals generated by the pressure transducer 28 of the vortex flowmeter 30 are then tabulated and stored in the spectral database 43. Alternatively, spectra for a plurality of combinations of steady-state flow velocity and pulsating flow velocity are calculated, in a manner described below, and the results are tabulated and stored in the spectral database 43.

The spectral database 43 is in communication with a pattern comparator 45 that compares the measured spectrum of the pressure signal with one or more calibration spectra from the spectral database 43. When the pattern comparator 45 obtains a good match between the measured spectrum and one of the calibration spectra, the flow characteristics associated with that one of the calibration spectra are selected as the output of the pattern recognition module 42. These flow characteristics include the steady component of the flow as well as the amplitude and frequency of the pulsatile component of the flow.

In a preferred embodiment, the flow characteristics are provided to a lock-in detector 46 to determine whether a lock-in condition is likely to exist. The lock-in detector 46 obtains the flow characteristics from the pattern recognition module 42. Alternatively, the lock-in detector 46 obtains the pulsation amplitude and frequency from the pattern-recognition module 42 and the steady-state vortex-shedding frequency from the pressure signal generated by the pressure transducer 26. The lock-in detector 46 is configured to communicate the likely existence of a lock-in condition to a system operator, preferably by transmitting a signal to an alarm unit 48 under observation by a system operator.

As shown in FIG. 3, the flow characteristics generated by the pattern recognition module 42 are also provided to the velocity computation module 32. This data then enables the velocity computation module 32 to select the appropriate meter factor curve from the meter-factor calibration database 33 and to use that meter factor curve to estimate the steady-state flow velocity. The measured flow velocity generated by the velocity computation module 32 is thus corrected for the existence of pulsating flow at the amplitude and frequency detected by the pattern recognition module 42.

In an optional feature of the invention, the velocity computation module 32 generates information indicative of the quality or the reliability of the estimate of the steady-state flow velocity.

In operation, fluid flow past the bluff body 12 generates vortices at the leading edge 14 of the bluff body 12. These vortices, which correspond to small regions of low pressure, are swept past the pressure transducer 26 by the fluid flow. In response to the low pressure associated with the vortices flowing past it, the pressure sensitive membrane 28 mounted on the pressure transducer 26 deflects. This results in a pressure signal, examples of which are shown in FIGS. 4A and 4B.

Figure 4A:
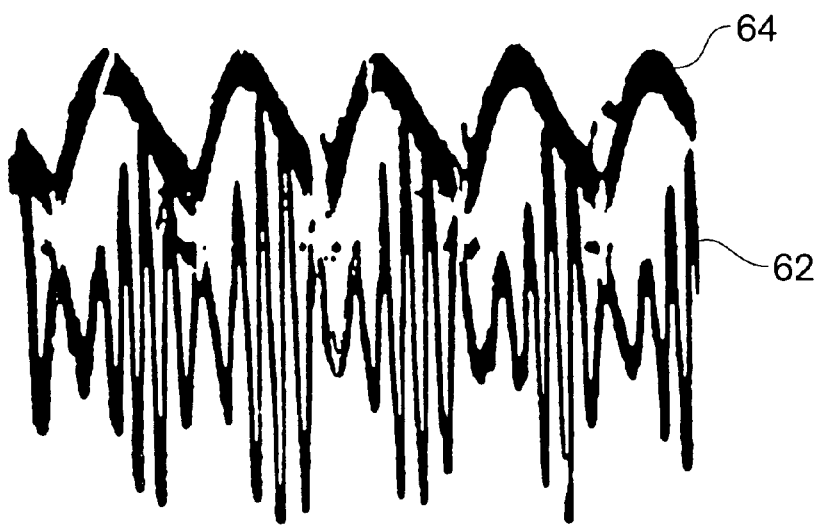
FIGS. 4A and 4B show two modulations imposed on a pressure signal by a pulsatile disturbance in the flow at two different pulsation frequencies.
Figure 4B:
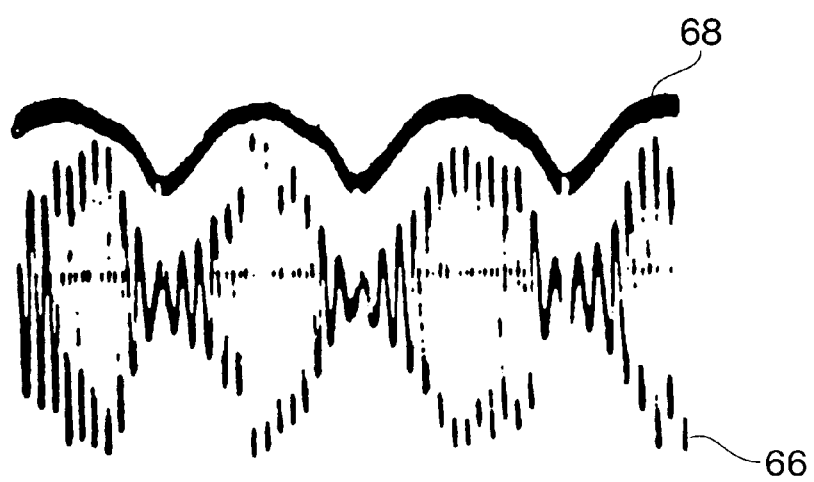

The lower curve 62 in FIG. 4A shows a typical time-domain pressure signal generated by the pressure transducer 26 when the fluid velocity is subjected to the pulsatile disturbance shown on the upper curve 64 in FIG. 4A. It is apparent from examining FIG. 4A that as a result of the modulation of the time-domain pressure signal 62 by the pulsatile disturbance 64, the spectrum of the time-domain pressure signal 62 will include frequency components corresponding to the pulsation frequency and frequency components corresponding to the steady-state vortex-shedding frequency.

The extent to which the pulsating flow modulates the time-domain pressure signal depends strongly on the pulsation frequency. For example, FIG. 4B shows that a small change in the pulsation frequency (the upper curve 68 of FIG. 4B) results in a time-domain pressure signal (the lower curve 66) that is significantly different from that shown in FIG. 4A.

The pressure signal generated by the pressure transducer 26 is then provided to the spectrum analyzer 38 for decomposition into its spectrum of frequency components. This task is performed in the conventional manner by evaluating the FFT of the pressure signal, either by executing software instructions on a digital computer of by using an ASIC, or similar hardware. The resulting spectrum is then passed to the pattern recognition module 42 for determination of the pulsation amplitude and frequency.

In determining the pulsation amplitude and frequency, the pattern recognition module 42 uses the fact that the signal spectrum of the pressure signal typically includes a center frequency and numerous sidebands. These sidebands are separated from each other, and from the center frequency, by integer multiples of the pulsation frequency. For example, if there exists a pulsatile flow with a pulsation frequency $\omega_p$ superimposed on a steady flow which, by itself, would result in a vortex-shedding frequency $\omega_v$, then the resulting spectrum would contain a center frequency component at $\omega=\omega_v$ and sidebands at $\omega=\omega_v \pm n\omega_p$ for integer values of n. The relative amplitudes of these sidebands are indicative of the amplitude of the pulsating flow.

Figure 5A:
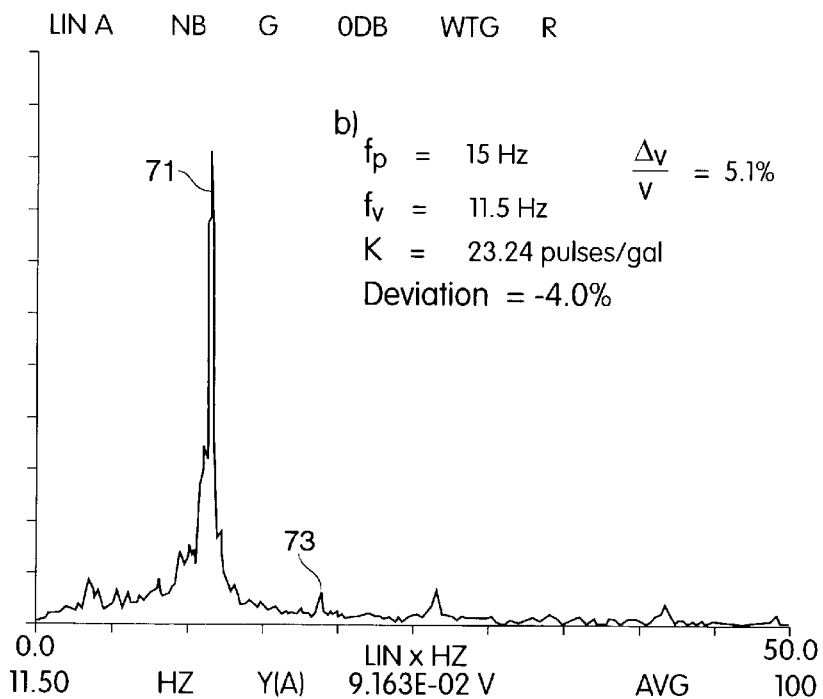
FIG. 5A shows a typical spectrum resulting from modulation of the pressure signal by a pulsating flow.

FIG. 5A shows a typical spectrum resulting from a flow having a steady component and a pulsatile component. The steady component, by itself, would result in a steady-state vortex-shedding frequency of 20.2 Hz. The pulsatile component has a 2.5 Hz pulsation frequency and a pulsation amplitude approximately ¼ of the magnitude of the steady component of the flow velocity. Examination of FIG. 5A reveals a spectrum having a dominant component 71 very close to the 20.2 Hz steady-state vortex-shedding frequency. In addition, the spectrum includes numerous harmonics 73 separated from each other by integer multiples of the 2.5 Hz pulsation frequency.

A theoretical basis for the spectral structure shown in FIG. 5A can be derived by considering the pressure signal from the pressure transducer 26 to be an FM signal having a carrier frequency equal to the steady-state vortex-shedding frequency $f_v$ and being modulated by a signal having the pulsation frequency $f_p$. In the case in which no pulsation is present, the pressure signal can thus be approximated by:

$$\Delta p = A \sin(2\pi f_v t) = A \sin \phi \qquad (1)$$

Such a signal corresponds to a chain of vortices shed at a steady-state vortex-shedding frequency $f_v$. The quantity $\phi$ is the instantaneous phase of the pressure signal, for which the corresponding instantaneous frequency is $$\frac{d\phi}{dt} = 2\pi f_v \qquad (2)$$

In the case of pulsating flow, the flow velocity is given by a steady component and a pulsatile component as shown below:

$$v(t) = \left(\bar{v} + \left(\frac{\Delta v}{\bar{v}}\right)\bar{v}\cos(2\pi f_p t)\right) \qquad (3)$$

where $\bar{v}$ is an average velocity of the steady component, $\Delta v$ is the amplitude of the oscillation associated with the pulsatile component, and $f_p$ is the pulsation frequency. The time-varying flow results in a time-varying instantaneous frequency or phase in the pressure signal of equation (1). To determine the effect of this time-varying flow given by equation (3) on the pressure signal, one substitutes equation (3) and equation (2) into equation (1). This results in an expression for the pressure signal in terms of the instantaneous frequency:

$$\Delta p = A\sin\left[2\pi\left(f_v + \left(\frac{\Delta v}{\bar{v}}\right)f_v\cos(2\pi f_p t)\right)\right] \qquad (4)$$

In order to express this quantity in terms of the instantaneous phase, it is necessary to integrate the instantaneous frequency:

$$\phi(t) = \int 2\pi\left(f_v + \left(\frac{\Delta v}{\bar{v}}\right)f_v\cos(2\pi f_p t)\right)dt \qquad (5)$$

Substitution of equation (5) into equation (4) yields the pressure signal resulting from the time-varying flow of equation (3):

$$\Delta p = A \sin(\omega_v t + \delta\sin(\omega_p t)) \qquad (6)$$

where the following simplifying substitutions have been made:

$$\delta = \left(\frac{\Delta v}{\bar{v}}\right)\left(\frac{f_v}{f_p}\right) \qquad (7)$$

$\omega_v = 2\pi f_v$ $\omega_p = 2\pi f_p$

To determine the frequency spectrum associated with the pressure signal, it is useful to write equation (6) in terms of an infinite series of nth order Bessel functions of the first kind. This can be accomplished by using the trigonometric identities:

$\sin(x+y) = \sin(x)\cos(y) + \cos(x)\sin(y)$ $$\sin(x)\cos(y) = \frac{1}{2}[\sin(x+y) + \sin(x-y)]$$

$$\sin(x)\cos(y) = \frac{1}{2}[\sin(x+y) - \sin(x-y)]$$

and the Bessel function identities:

$$\cos(\delta\sin(\omega_p t)) = J_0(\delta) + 2\sum_{n=1}^{\infty} J_{2n}(\delta)\cos(2n\omega_p t)$$

$$\sin(\delta\sin(\omega_p t)) = 2\sum_{n=0}^{\infty} J_{2n+1}(\delta)\sin[(2n+1)\omega_p t]$$

Using the foregoing identities, the pressure signal (equation (6)) can be expressed as:

$$\Delta p = \qquad (9)$$
$$A\left(J_0(\delta)\sin(\omega_v t) + \sum_{n=1}^{\infty} J_n(\delta)[\sin(\omega_v + n\omega_p)t + (-1)^n\sin(\omega_v - n\omega_p)t]\right)$$

Since the leading coefficient A in equation (4) in fact depends on the square of the flow velocity, it is necessary to substitute into equation (9) the expression:

$$A = C_p \rho \left( \bar{v} + \frac{\Delta v}{v} \cos \omega_p t \right)^2 \quad (10)$$

where $\rho$ is the fluid density and $C_p$ is a dimensionless pressure coefficient. This results in the following expression for $\Delta p$:

$$\frac{\Delta p}{\rho C_p v^2} = \sum_{n=-\infty}^{\infty} B_n \sin(\omega_v + n\omega_p)t \quad (11)$$

where $$B_n = (-1)^n J_n + b_{1n} v' + b_{2n} \frac{(v')^2}{2} \quad (12)$$

The first eleven coefficients $b_{1n}$ and $b_{2n}$ in equation 12 are given by

| n  | $b_{1n}$      | $b_{2n}$              |
|----|---------------|------------------------|
| 0  | 0             | $J_0 + J_2$            |
| ±1 | $(J_0 + J_2)$ | $\pm\frac{1}{2}(J_3 + J_1)$ |
| ±2 | $\pm(J_1 + J_3)$ | $\frac{1}{2}J_0 + J_2$ |
| ±3 | $J_2$         | $\pm(\frac{1}{2}J_1 + J_3)$ |
| ±4 | $\pm J_3$     | $\frac{1}{2}J_2 + J_4$ |
| ±5 | 0             | $\pm(\frac{1}{2}J_3 + J_5)$ | where $$v' = \frac{\Delta v}{v}$$

and the arguments to the Bessel functions (which are omitted for clarity) are as shown in equation (9).

It is evident from examination of equation (11) that the spectrum of the pressure signal $\Delta p$ has a structure consistent with that shown in FIG. 5A. The spectrum includes a dominant component, corresponding to n=0 in equation (11), and an infinite number of equally spaced sidebands corresponding to non-zero values of n in equation (11). The amplitudes of the spectral components depend on the relationship between the pulsation amplitude and frequency of the pulsating component, the steady-state vortex-shedding frequency (the vortex-shedding frequency in the absence of a pulsatile disturbance), and the magnitude of the steady component of flow. It is also apparent from equation (11) that these sidebands are separated from each other by integer multiples of the pulsation frequency. As a result, both the empirical data, of which FIG. 5A is an example, and the above theoretical formulation, confirm that one can estimate the pulsation amplitude and frequency by using the spacing between the sidebands of the spectrum of the signal from the pressure transducer 26 of the vortex-flowmeter 30 and the relative amplitudes of the sidebands.

Figure 6:
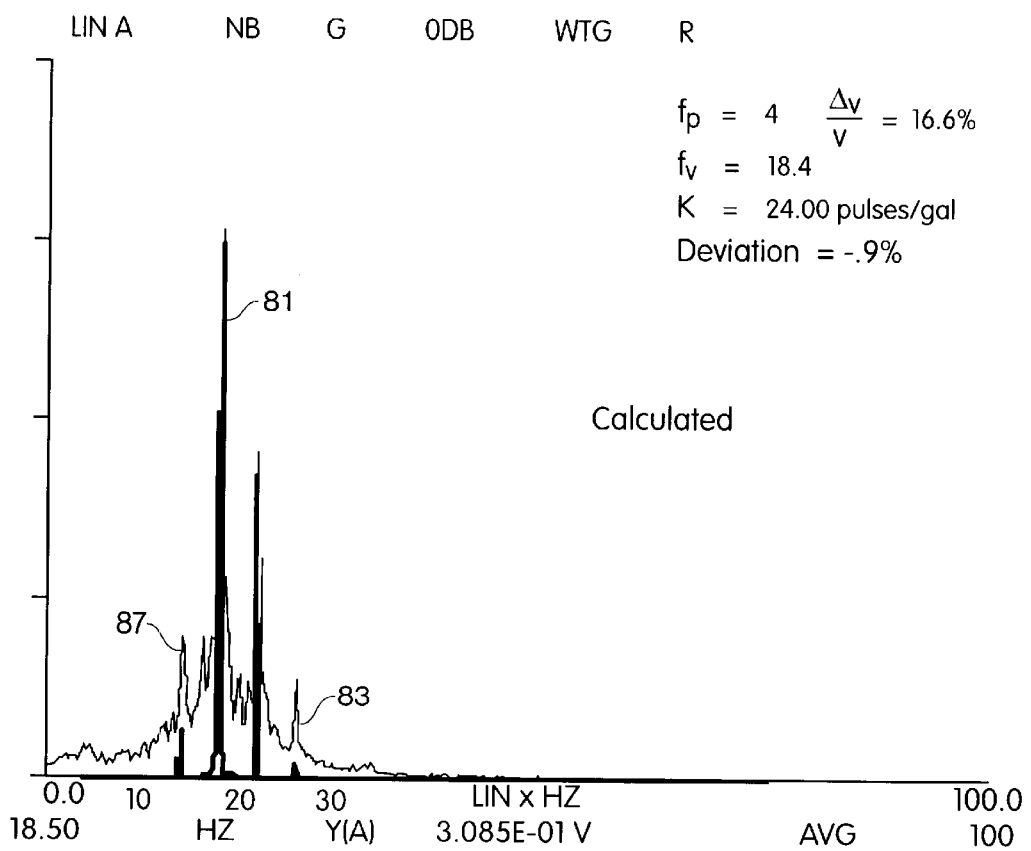
FIG. 6 shows a comparison between a calculated spectrum and a measured spectrum.

FIG. 6 shows an example of a calculated spectrum 81, generated using equation (11), overlaid on a measured spectrum 83 for the particular set of flow parameters summarized in the upper-right of the figure. It is apparent from examination of FIG. 6 that the measured spectrum 83 includes sidebands 87 at locations predicted by the calculated spectrum 81 and that consequently, the location of these sidebands 87 can be used to estimate the pulsation frequency associated with the pulsatile disturbance.

The foregoing Bessel function equations can readily be adapted for systems in which the vortex shedding frequency is obtained without a pressure measurement by a pressure transducer. In general, this is accomplished by altering those terms that depend on the dynamic pressure component $\frac{1}{2} \rho v^2$ to depend on the square of the velocity.

Figure 5B:
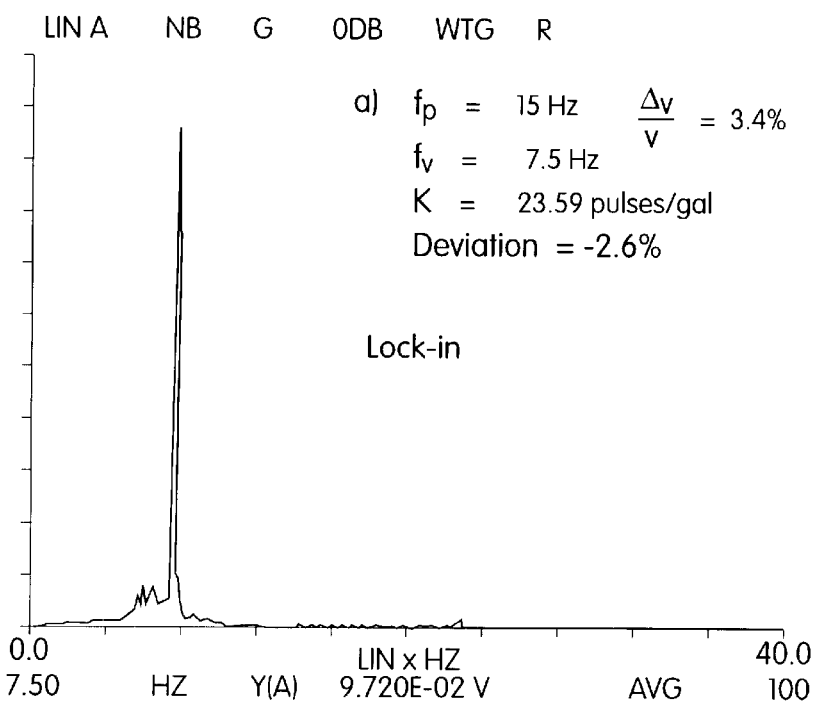
FIG. 5B shows the spectrum of the pressure signal when the pulsation frequency and the steady-state vortex-shedding frequency are such that a lock-in condition exists.

The spectrum shown in FIG. 5B results from a flow in which "lock-in" exists. In FIG. 5B, the steady component of the flow would, by itself, result in a steady-state vortex-shedding frequency of 7.5 Hz. The pulsatile component of the flow has a pulsation frequency of 15 Hz, which is double the 7.5 Hz vortex-shedding frequency associated with the steady component of the flow. A distinguishing feature of the lock-in condition is that the spectrum of the pressure signal does not include the harmonics seen in FIG. 5A. Instead the spectrum shows a single, narrow-band component at a frequency close to the 7.5 Hz vortex-shedding frequency.

As shown in FIG. 2, vortex flowmeter measurements taken on those rare occasions when "lock-in" exists are likely to be unreliable. It is therefore desirable to warn the system operator that lock-in exists or threatens to exist so that the system operator can take appropriate corrective action. For this reason, the flow characteristics obtained from the pressure signal by the pattern recognition module 42 are also provided to the lock-in detector 46.

The lock-in detector 46 determines if the pulsation frequency and the steady-state vortex shedding frequency are likely to result in a lock-in condition. It does so by determining if the sidebands of the spectrum are separated by, or approximately separated by, an integral multiple of the vortex-shedding frequency. In the overwhelming majority of cases, the lock-in detector 46 does nothing further. However, on those rare occasions in which the difference between two sidebands is within a first selected threshold value of being an integral multiple of the vortex-shedding frequency, the lock-in detector 46 examines the width of the center frequency component. As is apparent from comparing FIGS. 5A and 5B, the center frequency component is much narrower when lock-in is present than it is otherwise. The lock-in detector 46 uses this distinguishing characteristic of lock-in conditions by comparing the width of the center frequency component with a second selected threshold. If the width of the center frequency component is less than this second selected threshold, the lock-in detector 46 transmits an alarm signal to the alarm unit 48. The appropriate first and second threshold values depend on the characteristics of the fluid-transport system and are predetermined during a calibration process.

Upon receipt of the alarm signal from the lock-in detector 46, the alarm unit 48 generates an audible and/or visible indicator. If the system operator is dutifully observing the alarm unit 48, this indicator will prompt the system operator to take appropriate corrective action.

As is apparent from the foregoing description and drawings, the use of FM signal processing techniques in conjunction with vortex flowmeter operation, as described herein, enables the operator to correct for errors in the measurement of flow velocity caused by the interaction of the steady-state vortex-shedding frequency with the pulsatile component of flow. Additionally, a system according to the invention reduces the likelihood of measurement error when using a vortex flowmeter in pulsating flow conditions by warning the operator of the existence or the impending onset of a lock-in condition.

The various components of a vortex flowmeter embodying the invention can be realized in hardware, by software running on a digital computer, or by a combination of the two. For example, the spectrum analyzer 38 can be a hardware device and the pattern recognition unit 42 can be implemented as software on a digital computer in communication with the spectrum analyzer 38. Alternatively, the pattern recognition unit 42 can be implemented on an application specific integrated circuit. The subject matter of the invention does not depend on the implementation of the individual components but on the manner in which the components interact to enable the flow measurement system to correct for errors arising from pulsating flow conditions.

Having described the invention and a preferred embodiment thereof, what is claimed as new and secured by Letters Patent is:

1. A method for estimating pulsatile flow characteristics in a fluid flow having a pulsatile component, said method comprising the steps of
generating a flowmeter signal having a frequency modulated by the pulsatile component,
obtaining a measured spectrum of the flowmeter signal,
estimating the pulsatile flow characteristics on the basis of the measured spectrum.

2. The method of claim 1 wherein the step of obtaining a measured spectrum comprises the step of
resolving the measured spectrum into a first spectral component and a second spectral component, the first and second spectral components separated by a gap therebetween.

3. The method of claim 2 wherein the step of estimating the pulsatile flow characteristics comprises the step of
estimating a pulsation frequency on the basis of the gap between the first and second spectral components, the gap being representative of the pulsation frequency.

4. The method of claim 2 wherein the step of estimating the pulsatile flow characteristics comprises the step estimating a pulsation amplitude on the basis of the relative amplitude of the first and second spectral components.

5. The method of claim 2 further comprising the steps of
determining whether the gap between the first and second spectral components is below a first selected threshold, and
if the gap is below the first selected threshold, determining whether the width of the first spectral component is below a second selected threshold, and, if the width is below the second selected threshold, generating an alarm signal indicative of a lock-in condition.

6. The method of claim 1 wherein the step of generating a flowmeter signal comprises the steps of
providing a structure in the fluid flow for generating vortices at a vortex-shedding frequency indicative of the flow velocity, and
generating a flowmeter signal representative of the vortex-shedding frequency.

7. The method of claim 6 further comprising the step of detecting said flowmeter signal with a transducer.

8. The method of claim 7 further comprising the step of selecting said transducer to be a pressure transducer.

9. The method of claim 7 further comprising the step of selecting said transducer to be a radiation responsive transducer.

10. The method of claim 1 wherein the step of estimating the pulsatile flow characteristics on the basis of the measured spectrum comprises the step of comparing the measured spectrum to a calibration spectrum corresponding to a known flow condition.

11. The method of claim 10 further comprising the step of providing empirically determined calibration spectra for comparison with the measured spectrum.

12. The method of claim 10 further comprising the step of providing calculated calibration spectra for comparison with the measured spectrum.

13. The method of claim 1 further comprising the step of estimating a steady-state flow velocity of said fluid flow on the basis of said pulsatile flow characteristics.

14. The method of claim 13 further comprising the step of providing information indicative of the reliability of the estimate of the steady-state flow velocity.

15. The method of claim 13 wherein said step of estimating said steady-state flow velocity comprises the step of selecting a meter-factor corresponding to said pulsatile flow characteristics.

16. A vortex flowmeter comprising:
a housing,
a vortex-shedding structure mounted on said housing and exposed to a fluid flow, said vortex-shedding structure generating vortices at a vortex-shedding frequency indicative of a flow velocity of the fluid flow,
a transducer proximate to said vortex-shedding structure for detecting the vortices shed by said vortex-shedding structure and generating a frequency modulated flowmeter signal therefrom, said frequency modulated flowmeter signal being modulated by a pulsatile component of the fluid flow, said pulsatile component having pulsatile flow characteristics,
spectrum analyzer means for obtaining a measured spectrum of the frequency modulated flowmeter signal, and
pattern recognition means coupled to the spectrum analyzer means for estimating the pulsatile flow characteristics on the basis of the measured spectrum.

17. The vortex flowmeter of claim 16 wherein the spectrum analyzer means comprises
spectral resolution means for resolving the measured spectrum into a first spectral component and a second spectral component, the first and second spectral components separated by a gap therebetween.

18. The vortex flowmeter of claim 17 wherein the pattern recognition means comprises
gap measurement means for estimating a pulsation frequency on the basis of the gap between the first and second spectral components, the gap being representative of the pulsation frequency.

19. The vortex flowmeter of claim 17 wherein the pattern recognition means comprises
amplitude measurement means for estimating a pulsation amplitude on the basis of the relative amplitudes of the first and second spectral components.

20. The vortex flowmeter of claim 17 further comprising
first thresholding means coupled to the spectrum analyzer means for determining whether the gap between the first and second components is below a first selected threshold,
second thresholding means coupled to the first thresholding means for determining whether the width of the first spectral component is below a second selected threshold, and
an alarm signal generator coupled to the first and second thresholding means for generating an alarm signal indicative of a lock-in condition when the gap is below the first selected threshold and the width is below the second selected threshold.

21. The vortex flowmeter of claim 16 wherein said vortex-shedding structure comprises a shedder bar mounted on said housing, and a transducer coupled to said shedder bar.

22. The vortex flowmeter of claim 16 wherein said transducer is a pressure transducer.

23. The vortex flowmeter of claim 16 wherein said transducer is a radiation-responsive transducer.

24. The vortex flowmeter of claim 16 wherein the pattern recognition means comprises a comparator for comparing the measured spectrum to a calibration spectrum corresponding to a known flow condition.

25. The vortex flowmeter of claim 16 further comprising a velocity computation means in communication with said pattern recognition means and adapted to estimate a steady-state flow velocity on the basis of said flow-meter signal and said pulsatile flow characteristics.

26. The vortex flowmeter of claim 25 further comprising a meter-factor calibration database in communication with said velocity-computation means, said calibration database being adapted to provide said velocity computation means with data relating said pulsatile flow characteristic with said steady-state flow velocity.

27. The vortex flowmeter of claim 25 further comprising flowmeter validation means for generating information indicative of the quality of the estimate of the steady-state flow velocity.

28. A vortex flowmeter comprising:

a housing, a vortex-shedding structure mounted on said housing and exposed to a fluid flow, said vortex-shedding structure generating vortices at a vortex-shedding frequency indicative of a flow velocity of the fluid flow, a transducer proximate to said vortex-shedding structure for detecting the vortices shed by said vortex-shedding structure and generating a frequency modulated flow-meter signal therefrom, said frequency modulated flowmeter signal being modulated by a pulsatile component of the fluid flow, said pulsatile component having pulsatile flow characteristics, a spectrum analyzer for obtaining a measured spectrum of the flowmeter signal, and a pattern recognition module coupled to the spectrum analyzer for estimating the pulsatile flow characteristics on the basis of the measured spectrum.

29. The vortex flowmeter of claim 28 wherein the spectrum analyzer comprises a module to resolve the measured spectrum into a first spectral component and a second spectral component, the first and second spectral components separated by a gap therebetween.

30. The vortex flowmeter of claim 29 wherein the pattern recognition module comprises a module to estimate a pulsation frequency on the basis of the gap between the first and second spectral components, the gap being representative of the pulsation frequency.

31. The vortex flowmeter of claim 29 wherein the pattern recognition module comprises a module to estimate a pulsation amplitude on the basis of the relative amplitudes of the first and second spectral components.

32. The vortex flowmeter of claim 29 wherein the module further comprises a first threshold for comparison to the gap between the first and second components, a second threshold for comparison to the width of the first spectral component, and an alarm signal generator for generating an alarm signal indicative of a lock-in condition when the gap is below the first threshold and the width is below the second threshold.

33. The vortex flowmeter of claim 28 wherein said vortex-shedding structure comprises a shedder bar mounted on said housing, and a transducer coupled to said shedder bar.

34. The vortex flowmeter of claim 28 wherein said transducer is a pressure transducer.

35. The vortex flowmeter of claim 28 wherein said transducer is a radiation-responsive transducer.

36. The vortex flowmeter of claim 28 wherein the pattern recognition module comprises a comparator for comparing the measured spectrum to a calibration spectrum corresponding to a known flow condition.

37. The vortex flowmeter of claim 28 further comprising a velocity computation module in communication with said pattern recognition module and adapted to estimate a steady-state flow velocity on the basis of said flow-meter signal and said pulsatile flow characteristics.

38. The vortex flowmeter of claim 37 further comprising a meter-factor calibration database in communication with said velocity-computation module, said calibration database being adapted to provide said velocity computation module with data relating said pulsatile flow characteristic with said steady-state flow velocity.

39. The vortex flowmeter of claim 37 further comprising a flowmeter validation module for generating information indicative of the quality of the estimate of the steady-state flow velocity.

* * * * *